United States Patent [19]

Looschen

[11] 4,271,510
[45] Jun. 2, 1981

[54] SHIFT-REGISTER TRANSMITTER FOR USE IN A HIGH SPEED, LOW NOISE DIGITAL DATA COMMUNICATION SYSTEM

[75] Inventor: Floyd W. Looschen, Laguna Beach, Calif.

[73] Assignee: Burroughs Corporation, Detroit, Mich.

[21] Appl. No.: 58,907

[22] Filed: Jul. 19, 1979

Related U.S. Application Data

[62] Division of Ser. No. 883,302, Mar. 3, 1978, Pat. No. 4,225,752.

[51] Int. Cl.³ .......................... H04J 3/12; H04L 25/45
[52] U.S. Cl. ..................................... 370/110; 375/36; 375/59; 375/113
[58] Field of Search ................. 375/36, 106, 111, 113, 375/59; 370/77, 85, 100, 110

[56] References Cited

U.S. PATENT DOCUMENTS

| | | | |
|---|---|---|---|
| 3,862,373 | 1/1975 | Cohen et al. | 370/110 |
| 3,870,828 | 3/1975 | Saliga | 370/110 |
| 4,220,822 | 9/1980 | Kawai et al. | 370/85 |

*Primary Examiner*—Marc E. Bookbinder
*Attorney, Agent, or Firm*—Nathan Cass; Kevin R. Peterson; David G. Rasmussen

[57] ABSTRACT

Shift-register transmitting means for use in a serial type data transmission channel employing a plurality of coaxial lines for communicating digital data from the transmitting means to a receiving means. The transmitter means comprises a plurality of shift registers and associated transmitter logic which provide for the transmission of data messages and message identifying data on a first coaxial line and the transmission of a clock on a second coaxial line in a manner such that the transmitted clock is transmitted at a first repetition rate when a message is being transmitted and at a second repetition rate when message identifying data is being transmitted. The transmitter logic operates in conjunction with the shift registers for selectively shifting applied data in opposite directions so as to provide for the expeditious serial application of message and message identifying data to the first coaxial line during separate time periods.

8 Claims, 8 Drawing Figures

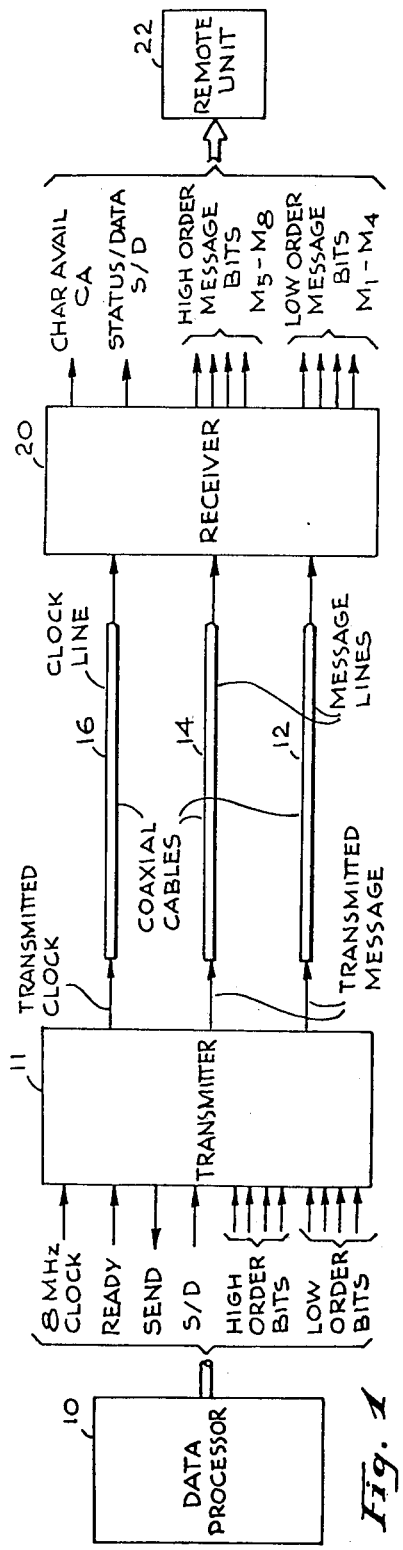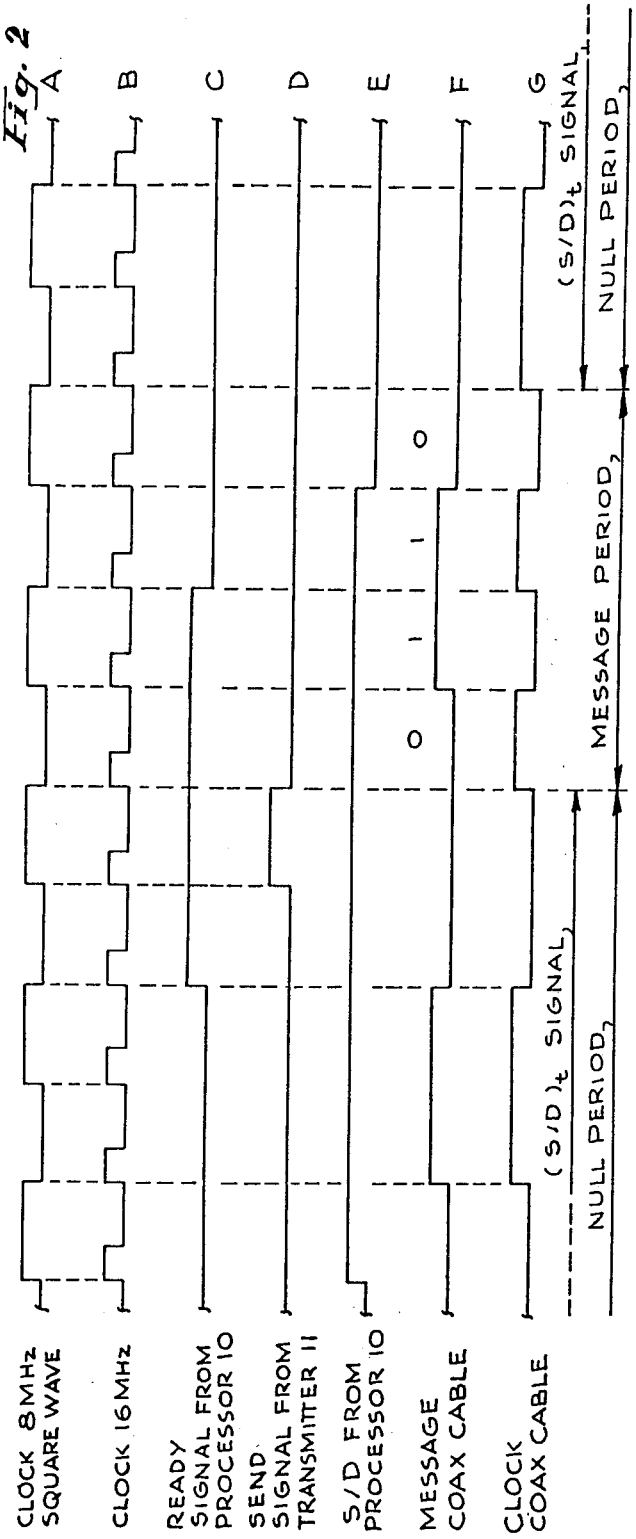

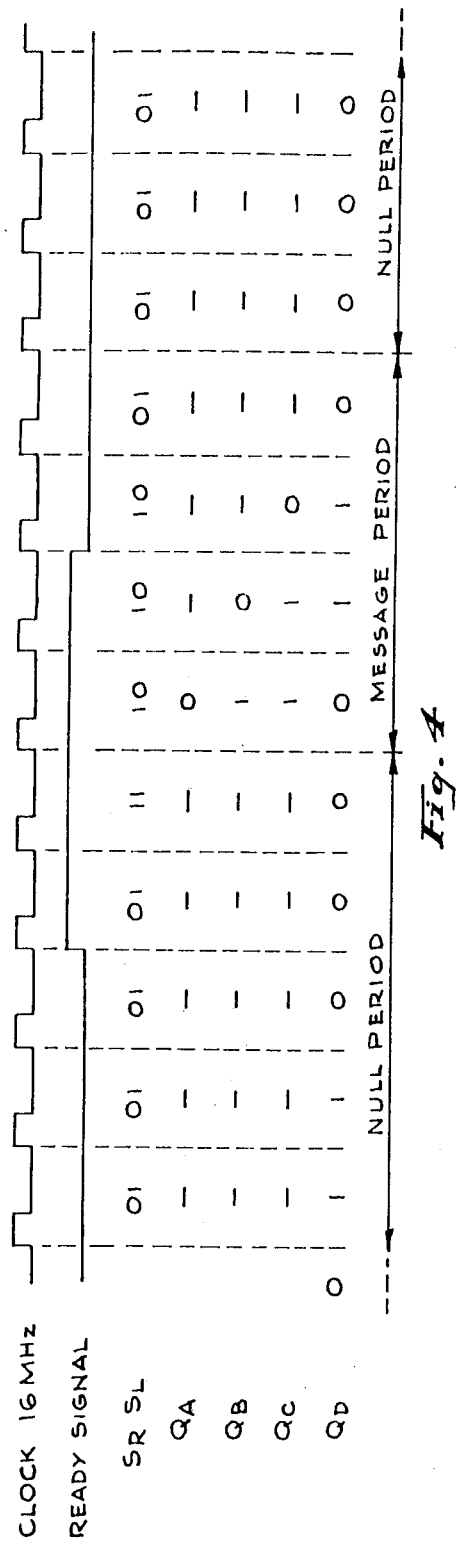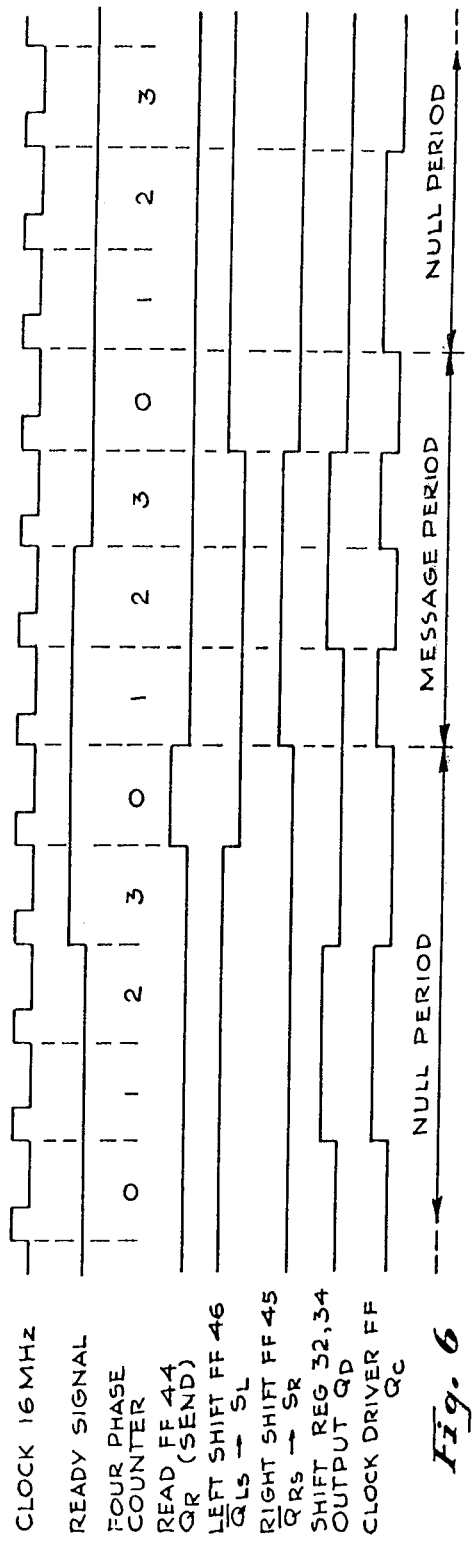

SHIFT-REGISTER TRANSMITTER FOR USE IN A HIGH SPEED, LOW NOISE DIGITAL DATA COMMUNICATION SYSTEM

CROSS REFERENCE TO RELATED APPLICATIONS

This application is a division of the commonly assigned copending patent application Ser. No. 883,302, filed Mar. 3, 1978 for *HIGH SPEED, LOW NOISE DIGITAL DATA COMMUNICATION SYSTEM,* Floyd William Looschen, inventor now U.S. Pat. No. 4,225,752.

BACKGROUND OF THE INVENTION

This invention relates generally to improved digital communication means and methods, and more particularly to improved shift-register transmitting means and methods useful for providing reliable, high speed transmission of digital data between units in a digital data processing system operating in a high noise environment.

Modern data processing systems have a number of different units between which binary digital data must be reliably communicated at high speed. Although parallel digital data communication has been employed in the prior art for providing digital data communication between data processing units, the current trend is toward the use of more serial-type transmission systems because of the cost and inconvenience of parallel communication systems, particularly where communication is required to be provided over distances greater than 100 feet. However, in order to make such serial-type digital data communication compatible with the speed capabilities of modern data processing systems, it is important that such a serial-type system be capable of providing relatively high digital data transmission rates. An example of an advantageous system of this type is disclosed in the commonly assigned copending applications Ser. No. 737,730 (now U.S. Pat. No. 4,083,010), Ser. No. 737,731 (now U.S. Pat. No. 4,084,069), Ser. No. 737,732 (now U.S. Pat. No. 4,083,005) and Ser. No. 737,783 (now U.S. Pat. No. 4,097,859), all filed on Nov. 1, 1976.

Although a variety of approaches and circuitry are known in the art for implementing a serial-type digital data transmission system, including the advantageous system referred to above, the prior art has nevertheless continued to experience considerable difficulties in providing a reliable, economically feasible high speed serial data transmission system, particularly where the system is required to operate in a high noise environment.

SUMMARY OF THE PRESENT INVENTION

In accordance with the present invention, improved means and methods are provided for implementing a serial-type digital data transmission channel in a manner which meets the performance requirements of modern day data processing systems and is also capable of providing reliable operation in a high noise environment.

In a particular preferred embodiment incorporating the invention, a serial data transmission channel is provided employing a plurality of coaxial cables with optical coupling being provided at the receiving end of each cable in a manner which provides for high common mode noise rejection. One of the coaxial cables is used to transmit a clock at one of a plurality of selectable frequencies, and another coaxial cable is used to serially transmit binary digital messages in a manner such that there is a maximum of one transition per bit. More than one coaxial cable transmission line may be provided for message transmission in order to increase the effective rate of data transmission.

The preferred embodiment to be described herein employs, for example, a data transmission channel having a total of three coaxial cables, one for clock and the other two for messages, the clock being selectively transmittable at either of two rates, for example, 16 mhz or 8 mhz. Message transmission on the data coaxial cable lines is at the 16 mhz rate. The clock is thus transmitted at its 16 mhz rate on the clock coaxial cable during message transmission. Between messages the clock is transmitted at its low rate of 8 mhz. In accordance with the invention this between-message or null period during which the clock is transmitted at its 8 mhz rate is advantageously employed to transmit an identifying signal on one or more of the message coaxial cables for providing an indication as to what type of next message is to be sent. The transmission of this identifying signal is detected by the receiver in response to receipt of the 8 mhz clock concurrently therewith. For example, where the transmission channel is to be used to provide transmission from a data processor to a peripheral unit, messages may typically be of two types, data messages and control messages. Accordingly, the identifying signal transmitted during the between-message or null period may simply be a single binary signal for which one binary value indicates that the next following message will be a data message, while the other binary value indicates that the next following message will be control message such as a status message.

The present invention is primarily directed to the specific manner in which the transmitting portion of the preferred embodiment generally described above is implemented using shift register means and associated transmitter logic. In this regard, it is to be noted that the preferred embodiment of the invention has been found able to achieve an effective data transmission rate in excess of 30 megahertz over a distance of 300 feet.

The specific nature of the invention as well as other objects, features, advantages and uses thereof will become readily apparent from the following description of a preferred embodiment of the invention taken in conjunction with the accompanying drawings.

DESCRIPTION OF THE DRAWINGS

FIG. 1 is an overall block and schematic diagram generally illustrating a preferred embodiment of a digital data transmission channel in which the present invention may advantageously be incorporated.

FIG. 2 is a series of graphs illustrating the operation of the digital data transmission channel of FIG. 1.

FIG. 4 is a series of graphs illustrating the operation of the shift registers in FIG. 3.

FIG. 6 is a series of graphs illustrating the operation of the transmitter logic shown in FIG. 5.

DETAILED DESCRIPTION

Figure 3:
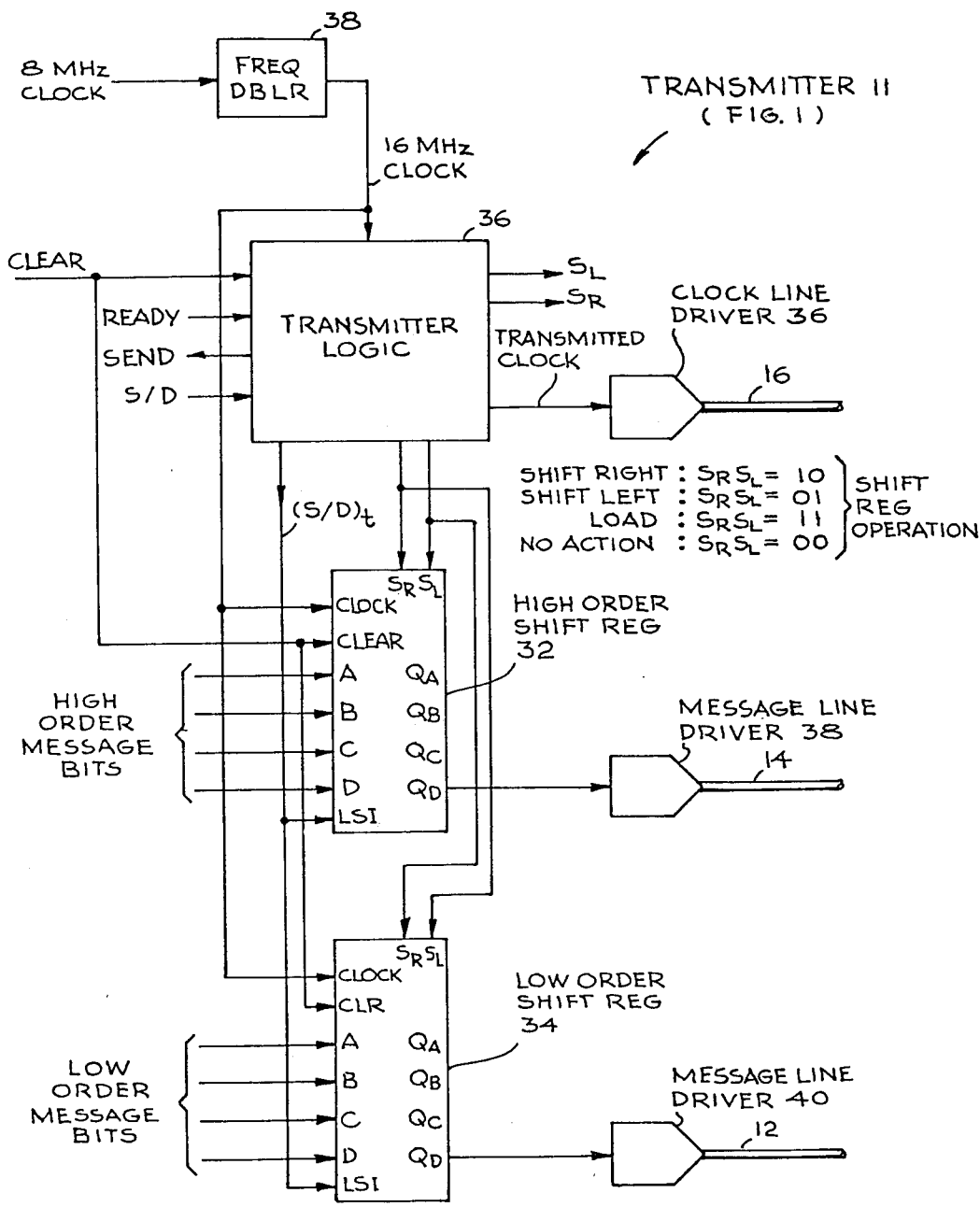
FIG. 3 is an electrical diagram of a preferred embodiment of the transmitter illustrated in block form in FIG. 1 incorporating the shift register means and transmitter logic of the present invention.

Like designations refer to like elements throughout the figures of the drawings.

Reference is initially directed to the overall block and schematic diagram of the digital data communication channel shown in FIG. 1 for consideration along with the graphs of FIG. 2 which illustrate the basic operation thereof. It is to be understood that the graphs in FIG. 2 (as well as those shown in other figures) are idealized in that transitions in the digital waveforms are indicated by vertical lines, the showing of actual rise and fall times being unnecessary to an understanding of the invention.

As shown in FIG. 1, the illustrated digital data transmission channel basically comprises a transmitter 10 which serially transmits digital data to a receiver 20 over a plurality of coaxial cables 12, 14 and 16. Such a channel may, for example, be employed for transmitting data and status-type control messages from a data processor 10 to a remote unit 22. It will be understood that in order to provide transmission in the opposite direction, an additional like transmission channel would be provided. For the purposes of the description to be provided herein, it will be assumed that coaxial cables 12 and 14 are provided for transmitting either data or status messages at a rate of 16 mhz, while coaxial cable 16 is provided for transmitting a clock at one of two repetition rates, 8 mhz or 16 mhz. It is to be understood that more or less message lines could be provided in accordance with the invention depending on the effective overall transmission rate desired.

Graph A in FIG. 2 illustrates an 8 mhz clock which will be assumed to be applied to transmitter 11 from processor 10, and Graph B illustrates the 16 mhz clock derived therefrom for use by transmitter 11. Graph C in FIG. 2 illustrates a Ready signal applied to transmitter 11 from processor 10. This Ready signal becomes true or "1" at the beginning of a message to indicate to transmitter 11 that processor 10 is ready to transmit a message. The Ready signal remains true until the last character of a message is transferred from processor 10. For illustrative purposes it will be assumed that each character of a message is 8-bits long, the high order 4-bits of each message character provided by processor 10 being serially transmitted by coaxial cable 12 and the low order 4-bits being serially transmitted by coaxial cable 14. A message may contain any desired number of these 8-bit characters.

Graph D in FIG. 2 illustrates a Send signal which remains true or "1" for one 16 mhz clock period, and which is outputted to processor 10 from transmitter 11 in FIG. 1 when an applied Ready signal is true and transmitter 11 is ready to receive the next message character from processor 10. Graph E in FIG. 2 illustrates a Status/Data signal provided by processor 10 along with the Ready signal and prior thereto, for indicating whether the next message to be transmitted is a data message or a status message. For example, it may arbitrarily be assumed that an S/D value of "1" indicates a data message, and an S/D value of "0" indicates a status message.

Graph F in FIG. 2 illustrates a typical signal transmitted by transmitter 11 in FIG. 1 on coaxial cable message line 12. It will be remembered that message line 12 is used to transmit the high order 4-bits of each character of an 8-bit message, while coaxial cable message line 14 is used to transmit the low order 4-bits of the message. Thus, Graph F illustrates the transmission of the four high or low order bits 0110 of a single character data message which is sent by a coaxial message line during a message period. As further illustrated in Graph F of FIG. 2, periods outside the message period are designated as null periods. With regard to the clock concurrently transmitted on clock coaxial cable line 16, it will be seen from Graph G of FIG. 2 that the clock is transmitted at a 16 mhz rate during a message period and at an 8 mhz rate during a null period. As indicated in Graph F of FIG. 2, the null period is advantageously employed to transmit on at least one of message lines 12 and 14 the value of the applied S/D signal illustrated in Graph E of FIG. 2. As shown in Graph F, in order to provide a lower duty cycle, the S/D signal is transmitted as an 8 mhz square wave (see null period preceding message period in Graph F) when it has a "1" value indicative of a next following data message, or as a zero value signal (see null period following message period in Graph F) when it has a "0" value indicative of a status message.

Attention is now directed to FIG. 3 which illustrates a particularly advantageous embodiment of transmitter 11 shown in FIG. 1. It will be seen that transmitter 11 in FIG. 3 basically comprises: a high order shift register 32 to which the four high order bits of each message character are applied; a low order shift register 34 to which the four low order bits of each message character are concurrently applied; transmitter logic 36 for controlling the operation of shift registers 32 and 34; a frequency doubler 38 for generating from the 8 mhz clock shown in Graph A of FIG. 2 the 16 mhz clock shown in Graph B for use by shift registers 32 and 34 and transmitter logic 36; a clock line driver 40 responsive to transmitter logic 36 for driving clock coaxial line 16 with a clock such as illustrated by Graph G of FIG. 2; and two message line drivers 38 and 40 responsive to the outputs of shift registers 32 and 34, respectively, for driving coaxial message lines 14 and 12, respectively, with a signal such as illustrated by Graph F of FIG. 2.

The embodiment of the transmitter 11 shown in FIG. 3 will now be considered in more detail. Each of shift registers 32 and 34 shown in FIG. 3 may be implemented, for example, using a commercially available Texas Instruments 74S194 shift register integrated circuit chip. Such a chip has the inputs and outputs illustrated in FIG. 3 for each of shift registers 32 and 34, namely: A Clock input for receiving the 16 mhz clock generated by frequency doubler 38, the leading edge clock transition being used to initiate shift register operations; a Clear input for clearing the shift register to all "0" values; control inputs $S_L$ and $S_R$ for receiving binary signals from transmitter logic 36 which control shift register operations as follows (also set forth in FIG. 3): $S_R S_L = 10 =$ Shift Right, $S_R S_L = 01 =$ Shift Left, $S_R S_L = 11 =$ Load, and $S_R S_L = 00 =$ No Action; inputs A, B, C and D for receiving in parallel respective ones of the input message bits in response to the presence of an $S_R S_L = 11 =$ Load condition; outputs $Q_A$, $Q_B$, $Q_C$ and $Q_D$ for providing outputs respectively corresponding to the message bits received by inputs A, B, C and D in response to the leading edge transition of the most recently applied 16 mhz clock, the $Q_D$ output being used to feed the respective coaxial line message line driver 38 or 40; and a left shift input LSI for receiving an appropriate $(S/D)_t$ signal produced during a null period and having the form illustrated in Graph F of FIG. 2 so as to indicate whether the next message is to be a data message or a status message as described previously.

Still with reference to shift registers 32 and 34 in FIG. 3, it is to be understood that operation is such that, during a loading clock period when $S_R S_L = 11$, the message bits applied to inputs A, B, C and D appear at outputs $Q_A$, $Q_B$, $Q_C$ and $Q_D$, respectively, the $Q_D$ output being applied to its respective message line driver 38 or 40 for transmission over the respective message line 14 or 16. During a right shift clock period when $S_R S_L = 10$, shifting occurs from $Q_A$ to $Q_B$, from $Q_B$ to $Q_C$, and from $Q_C$ to $Q_D$, the binary value shifted to $Q_D$ again being applied to its respective driver 38 or 40 for transmission. It will be understood that such right shifting permits the corresponding four high or low message bits of an applied message character to be serially loaded into the respective shift register 32 or 34 and right shifted for serial transmission via output $Q_D$ in four clock periods, one for each message bit. These four clock periods comprise one loading clock period and three right shift clock periods.

The left shifting capability of each shift register 32 and 34 in FIG. 3 is advantageously employed to provide for transmission on one or both of message lines 12 and 14 of the $(S/D)_t$ signal (see Graph F in FIG. 2) for indicating whether the next message to be transmitted is to be a data message or a status message. In this regard it is to be understood that the operation of each shift register 32 and 34 during left shifting when $S_R S_L = 01$ is such that the binary value of $(S/D)_t$ applied to input LSI during each clock period is applied to one or both of message line drivers 38 and 40 via the respective $Q_D$ output. Although the $(S/D)_t$ signal can be satisfactorily transmitted using only one message line, it may be useful to transmit it on both message lines as shown in FIG. 3 for checking, testing and/or diagnostic purposes.

Attention is now directed to FIG. 4 which illustrates the operation of shift registers 32 and 34 in FIG. 3 in connection with transmission of the high order bits of the single character data message illustrated in Graph F of FIG. 2. To aid correlation of FIG. 4 with FIG. 2, the Ready signal shown in Graph C of FIG. 2 is repeated. A "1" or "0" during a clock period indicates the binary value of the corresponding $Q_A$, $Q_B$, $Q_C$, $Q_D$ signal during that clock period, and is used only for those clock periods for which the binary value of the corresponding signal is of significance in the operation. Where the binary output of a signal is not of significance during a clock period, then a "—" is used for the signal, such as is provided in FIG. 4 for $Q_A$, $Q_B$ and $Q_C$ during null periods. A "1" or "0" is always indicated for $Q_D$, since it is this shift register output which drives the respective line driver and thus determines the binary value of the signal to be transmitted over the respective coaxial line during each clock period.

FIG. 4 will now be considered in more detail. During the null period, transmitter logic 36 in FIG. 3 provides signals to the $S_R S_L$ shift register inputs such that $S_R S_L = 01 =$ Left Shift, thereby providing left shifting operation. This left shifting causes the 8 mhz square wave $(S/D)_t$ signal applied to the shift register LSI input to be transmitted via the shift register $Q_D$ output to the corresponding message line driver, as illustrated by the $Q_D$ output values in FIG. 4 provided during the null periods.

During the first clock of the message period indicated in FIG. 4, transmitter logic 36 provides signals to the $S_R$ and $S_L$ shift register inputs such that $S_R S_L = 11 =$ Load, causing the four high order bits 0110 to be loaded. As illustrated in FIG. 4, these high order bits thus appear at the outputs $Q_A$, $Q_B$, $Q_C$ and $Q_D$ during the first clock of the message period, the $Q_D$ output being transmitted during the same clock period via message line driver 38 in FIG. 3. During the following three clock periods of the message period, transmitter logic 36 provides signals to the $S_R$ and $S_L$ shift register inputs such that $S_R S_L = 10 =$ Right Shift, causing a right shift (that is, from $Q_A$ to $Q_B$ to $Q_C$ to $Q_D$ to $Q_A$) in response to each clock, thereby resulting in the consecutive serial transmission via $Q_D$ of the remaining three message bits of the single character message.

Following the message period in FIG. 4, a null period is again provided during which transmitter logic 36 provides signals to $S_R S_L$ such that $S_R S_L = 01 =$ Left Shift, thereby again causing transmission via $Q_D$ of the $(S/D)_t$ value applied to shift register input LSI, which this time is a constant zero signal as shown in Graph F of FIG. 2 and in FIG. 4. If the next message to be transmitted is to be a status message, $(S/D)_t$ will remain zero during the null period preceding the next message period. However, if the next message is to be a data message, transmitter logic 36, in response to an appropriate S/D signal from processor 10 (FIG. 1), will again provide $(S/D)_t$ as an 8 mhz square wave signal prior to occurrence of the Ready signal, as illustrated in Graphs C, E and F of FIG. 2.

Figure 5:
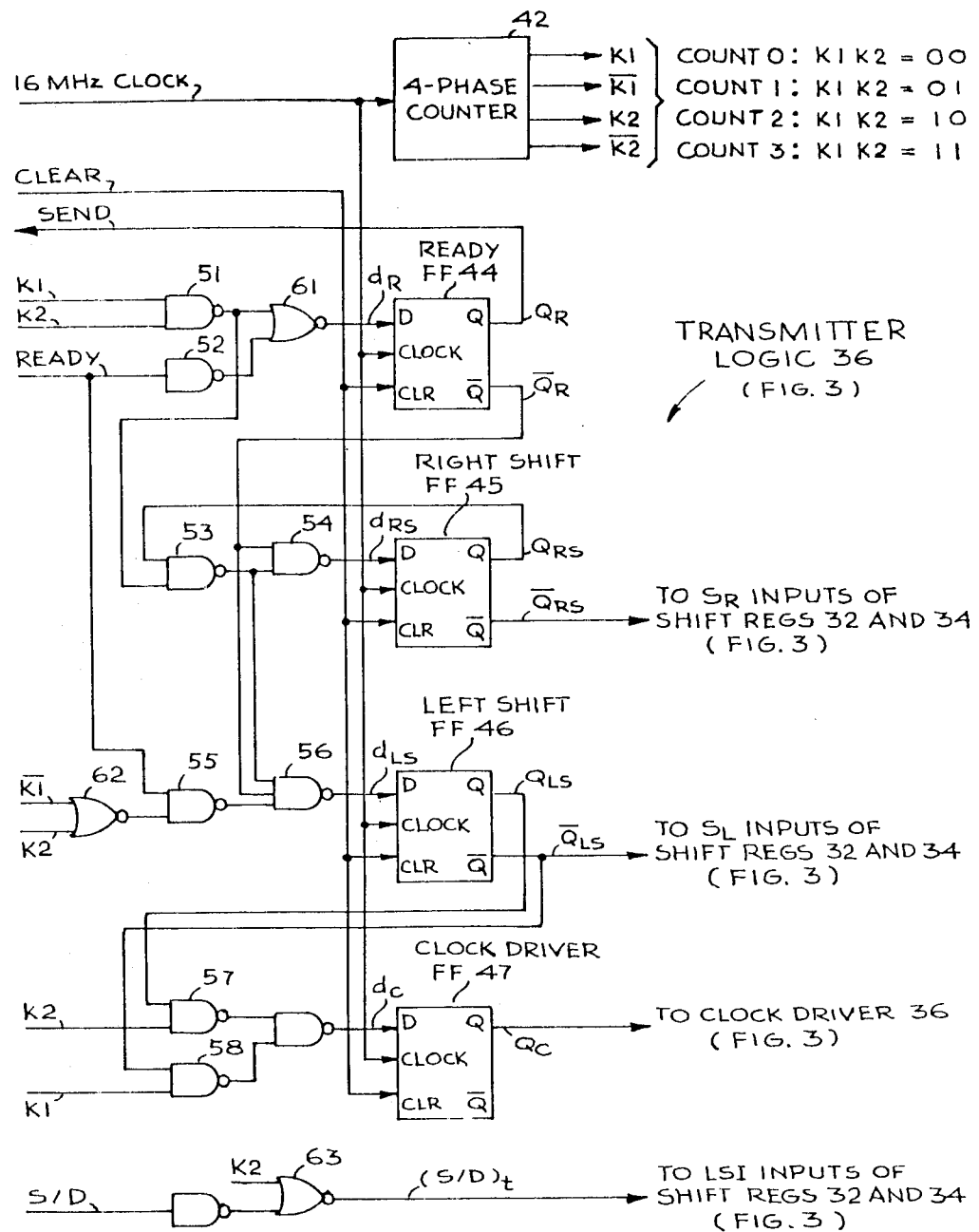
FIG. 5 is an electrical diagram illustrating a preferred embodiment of the transmitter logic illustrated in block form in FIG. 1.

The construction and operation of transmitter logic 36 in FIG. 3 will next be considered with reference to FIG. 5 which illustrates a preferred embodiment thereof. As shown in FIG. 5, transmitter logic 36 includes a four-phase counter 42 responsive to the 16 mhz clock for providing binary outputs K1, $\overline{K1}$ and K2, $\overline{K2}$ defining four repeating count periods 0, 1, 2 and 3 as follows (also shown in FIG. 5): Count 0: K1K2=00; Count 1: K1K2=01; Count 2: K1K2=10, and Count 3: K1K2=11. It will be understood that, as is conventional, a symbol having a "bar" over it has a binary value which is the inverse of the symbol without the bar, and vice versa. Thus, K1 and $\overline{K1}$ will always have inverse binary values as also will K2 and $\overline{K2}$. To aid in correlating FIG. 5 with the example illustrated in FIG. 4, it is to be noted that count 0 of counter 42 (K1K2=00) defines the clock period for which the shift register load operation ($S_R S_L = 11$) occurs.

In addition to the four-phase counter 42, transmitter logic 36 in FIG. 5 includes a plurality of D-type flip-flops operating in conjunction with a plurality of NAND gates 51–59 and NOR gates 61–63 so as to provide the operations previously described herein for the system of FIG. 1 and most particularly for transmitter logic 36 in FIG. 3.

As is well known, a NAND gate produces an output which is the inverse of the logical product of the inputs. For example, inputs X and Y applied to a NAND gate would produce a NAND gate output $\overline{(XY)} = \overline{X} + \overline{Y}$. A NOR gate, on the other hand, produces an output which is the inverse of the logical sum of the inputs. Thus, inputs X and Y applied to a NOR gate would produce a NOR gate output $\overline{(X+Y)} = \overline{X}\overline{Y}$. As is also well known, either a NAND gate or a NOR gate can be operated as an inverter by providing appropriate "0" or "1" values to its unused inputs. The use of a NAND gate as an inverter is illustrated, for example, by NAND gate 59 in FIG. 5 which receives the S/D signal.

As is further well known, a D-type flip-flop operates in response to each clock signal applied to its clock input to cause its Q and $\overline{Q}$ outputs to be switched to "1" and "0", respectively, (if not already in these states) when binary data applied to its D input is a "1" at the time the clock occurs, and vice versa when the binary data applied to its D input is a "0" when the clock occurs. For purposes of the present description, it is assumed that each D-type flip-flop is triggered in response to the leading edge of each applied 16 mhz clock pulse. A D-type flip-flop also typically includes a Clear input for clearing the flip-flop (i.e., setting Q=0 and $\overline{Q}=1$).

It will be noted in FIG. 5 that flip-flop 44 is a Ready flip-flop whose Q output provides the Send signal illustrated in FIGS. 1 and 3, the waveform of this Send signal being illustrated in Graph C of FIG. 2. Flip-flops 45 and 46 in FIG. 5 are respectively Right Shift and Left Shift flip-flops whose $\overline{Q}$ outputs respectively provide the control signals to the $S_R$ and $S_L$ inputs of shift registers 32 and 34 in FIG. 3 during appropriate clock periods (as determined by the values of K1 and K2 of counter 42) so as to provide for the load, shift left, and shift right operations of these shift registers, as described previously herein. The remaining flip-flop 47 illustrated in FIG. 5 is a Clock Driver flip-flop whose Q output is applied to clock driver 36 in FIG. 3 which, in response thereto, provides a clock of 8 mhz during null periods and 16 mhz during message periods, as illustrated by Graph G in FIG. 2.

The manner in which the input logic provided for each flip-flop in FIG. 5 is constructed and arranged to provide the above described operations will become readily evident from the graphs of FIG. 6 taken in conjunction with the following Boolean equations defining the logical conditions which determine when the d signal applied to the D input of each flip-flop is a "1" or true signal:

Ready flip-flop 44: $d_R = \text{Ready} \cdot K1 \cdot K2$
Right Shift flip-flop 45: $d_{RS} = Q_R + Q_{RS} \overline{K1K2}$
Left Shift flip-flop 46: $d_{LS} = (\text{Ready} + \overline{K1K2})$
$\overline{Q}_R (\overline{Q}_{RS} = K1K2)$
Clock Driver flip-flop 47: $d_C = Q_{LS} \overline{K2} + \overline{Q}_{LF} K1$ The generation in FIG. 5 of the transmitted Status/Data signal $(S/D)_t$ (see Graph F in FIG. 2) from the applied Status/Data signal S/D (Graph E in FIG. 2) is governed by the Boolean equation:

$(S/D)_t = S/D \overline{K2}$

It will be remembered that it is this $(S/D)_t$ signal which is applied to the shift register LSI inputs in FIG. 3.

Figure 7:
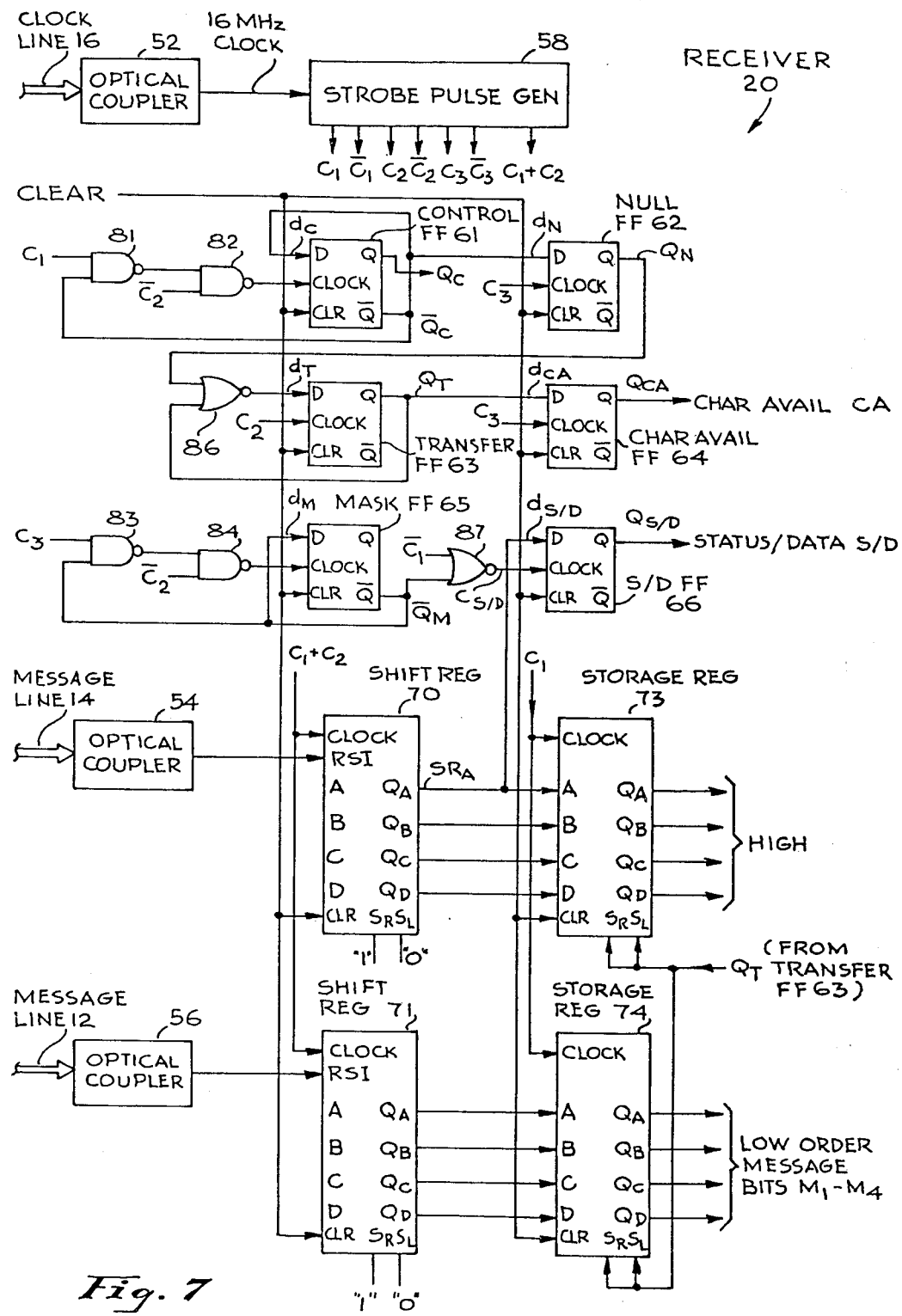
FIG. 7 is an electrical diagram illustrating a preferred embodiment of the receiver illustrated in block form in FIG. 1.
Figure 8:
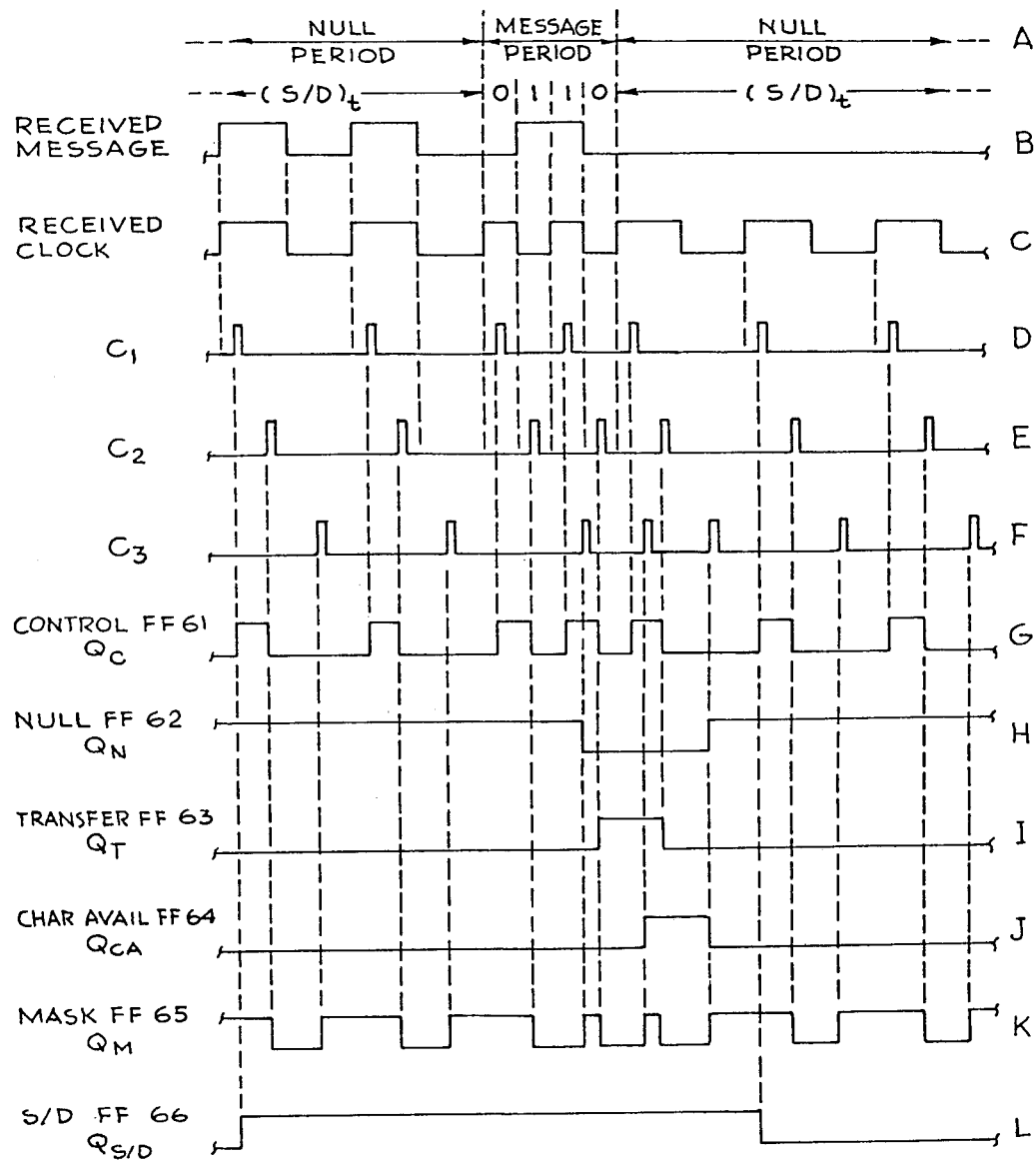
FIG. 8 is a series of graphs illustrating the operation of the receiver illustrated in FIG. 7.

Having considered the construction and operation of a preferred embodiment of the transmitter 11 in FIG. 1, next to be considered is a preferred embodiment of the receiver 20 in FIG. 1 with reference to the electrical diagram of FIG. 7 and the timing graphs of FIG. 8 which illustrate typical operation thereof.

Initially it is to be understood that receiver 20 operates in response to a received message and the clock signal transmitted by transmitter 11 so as to provide to remote unit 22 in FIG. 1, in parallel, each received eight-bit character $M_1$–$M_8$ of a message along with a Character Available signal CA indicating when a message character is available, and also a Status/Data Signal S/D indicating whether the received message is a data message or a status message. FIG. 7 illustrates a preferred embodiment of a receiver 20 which performs these functions in a particularly advantageous manner.

As illustrated in FIG. 7, the inputs to receiver 20 from coaxial lines 12, 14 and 16 are via respective optical couplers 52, 54 and 56 which provide low noise coupling as well as common mode rejection. These optical couplers may be of a standard commercially available type, such as for example, Hewlett Packard HCPL 2602 optical couplers. Graphs A and B in FIG. 8 illustrate typical message and clock signals appearing at the respective outputs of the optical couplers 52, 54 and 56. As pointed out previously, the transmitted Status/Data signal $(S/D)_T$ will be assumed to be transmitted on both message lines, although this is not necessary. It will be noted that, as is to be expected, Graphs A and B in FIG. 8 respectively correspond to Graphs F and G in FIG. 2 which illustrate the corresponding message and clock signals transmitted by transmitter 11.

As shown in FIG. 7, the received clock signal (Graph A in FIG. 8) provided by optical coupler 52 is applied to a strobe pulse generator 58 for generating a plurality of strobe pulses $C_1$, $\overline{C}_1$, $C_2$, $\overline{C}_2$, $C_3$, $\overline{C}_3$ and $C_1 + C_2$ having the relationships illustrated by Graphs C, D and E in FIG. 8. For greater timing accuracy, these strobe pulses are preferably generated by strobe pulse generator 58 in response to the high-to-low transition of clock line optical coupler 52 output. These strobe pulses are used for controlling the clocking of a plurality of D-type flip-flops 61–66, shift registers 70 and 71 and storage registers 73 and 74 in FIG. 7. This clocking provided by the strobe pulses in conjunction with the associated logic provided by NAND gates 81–84 and NOR gates 86 and 87 in FIG. 7 serve to extract, from the received clock (Graph B in FIG. 8) and message line signals (Graph A in FIG. 8), the corresponding high and low order bits $M_1$–$M_8$ of each received message character, and also a Character Available signal CA and a Status/Data signal S/D. The specific operation of the various components of receiver 20 shown in FIG. 7 will be evident from the graphs of FIG. 8 which illustrate the output states of flip-flops 61–66 during the receiving of a typical single character message. As a further aid in understanding the construction and operation of receiver 20 in FIG. 7, the applicable Boolean equations for the clock and data inputs of the flip-flops and registers are set forth below:

Control flip-flop 61: Clock=$C_1\overline{Q}_C + C_2$; $d_C = \overline{Q}_C$
Null flip-flop 62: Clock=$C_3$; $d_N = Q_C$
Transfer flip-flop 63: Clock=$C_2$; $d_T = \overline{Q}_N \overline{C}_T$
Character Available flip-flop 64: Clock=$C_3$; $d_{CA} = Q_T$
Mask flip-flop 65: Clock=$\overline{C}_2 C_3 \overline{Q}_M$; $d_M = \overline{Q}_M$
Status/Data flip-flop 66: Clock=$C_1 Q_M$; $d_{S/D} = SR_A$ Some additional details regarding the operation of receiver 20 in FIG. 7 will next be presented as a further aid in providing a full and complete understanding thereof. It will be understood from FIG. 7, the above equations, and the graphs of FIG. 8 that the basic purpose of the strobe $C_1 + C_2$ is to clock the incoming high and low order message bits into shift registers 70 and 71, the transfer to respective storage registers 73 and 74 occurring in response to the first $C_1$ pulse occurring after shift registers 70 and 71 have been serially loaded with their respective message bits. Storage registers 73 and 74 are advantageous in that they provide additional time for the remote unit 22 (FIG. 1) to make use of a received message character.

It is further to be noted that shift registers 70 and 71 as well as storage registers 73 and 74 may be implemented using the same type of commercially available shift registers employed for the transmitter shift registers 32 and 34 illustrated in FIG. 3. For this purpose, each of shift registers 70 and 71 has its right shift input RSI coupled to the respective message line optical coupler, while inputs $S_R$ and $S_L$ are continuously provided with "1" and "0" inputs, respectively, so as to provide right shift operation. For storage registers 73 and 74, $S_R$ and $S_L$ are connected together and also to the $Q_T$ output of Transfer flip-flop 63 whose true output thus determines when $S_R S_L = 11 = $ Load so as to thereby provide for transfer of the message bits set up in shift registers 70 and 71 to respective storage registers 73 and 74 in response to the $C_1$ strobe pulse occurring when the $Q_T$ output of Transfer flip-flop 63 is true, as illustrated in Graph I in FIG. 8.

Control flip-flop 61 in FIG. 8, which has its $\overline{Q}_C$ output fed back to its D input, is used for control purposes and sets (i.e., its Q output becomes true) on every $C_1$ strobe pulse and resets (i.e., its $\overline{Q}$ output becomes true) on every $C_2$ pulse so as to provide the waveform illustrated by Graph G in FIG. 8. The state of the $\overline{Q}_C$ output of control flip-flop 61 at $C_3$ strobe time determines the state set into the D input of Null flip-flop 62 in response to the $C_3$ strobe pulse applied to its clock input. The state of Null flip-flop 62 is illustrated in Graph H of FIG. 8 from which it will be understood that the $Q_N$ output of Null flip-flop 62 will be true during a null period and will become false in response to the first $C_3$ strobe pulse occurring after the received clock repetition rate changes from 8 mhz to 16 mhz, the null output $Q_N$ then remaining false until the first $C_3$ strobe pulse occurring after the received clock repetition rate changes from 16 mhz back to 8 mhz.

As mentioned previously, Transfer flip-flop 63 in FIG. 7, which is clocked by the $C_2$ strobe pulse, controls the transfer of a message character from shift registers 71 and 72 to respective storage registers 73 and 74. The $Q_T$ output of Transfer flip-flop 63 is shown by Graph I in FIG. 8. It will be understood that the operation of Transfer flip-flop 63 is to initially set ($Q_C$ becomes true) in response to the first $C_2$ strobe pulse occurring after the Null flip-flop $Q_N$ output becomes false, and then reset ($Q_C$ becomes false) in response to the next occurring $C_2$ pulse. Since the Transfer flip-flop $Q_T$ output is applied to both of the storage register $S_L$ and $S_R$ inputs to thereby signify a Load operation, the operation of Transfer flip-flop 63 is such as to in effect select the appropriate $C_1$ strobe pulse for use by storage registers 73 and 74 for initiating the transfer of a message character thereto from respective shift registers 71 and 72. Character Available flip-flop 64, which is clocked by $C_3$ and whose $Q_{CA}$ output is shown by Graph J in FIG. 8, is provided to indicate when a message character is available in storage registers 73 and 74. This is readily achieved by applying the Transfer flip-flop $Q_T$ output to the D input of Character Available flip-flop 64 so that, as shown in Graph J of FIG. 8, Character Available flip-flop 64 is set in response to the $C_3$ strobe pulse following the selected $C_2$ strobe pulse which initiated transfer of the message character to storage registers 73 and 74.

The remaining flip-flops in FIG. 7 to be considered are Mask flip-flop 65 and Status/Data flip-flop 66. Mask flip-flop 65, whose $Q_M$ output is illustrated by Graph K in FIG. 8, serves to provide a mask such that the clock input of Status/Data flip-flop 66 receives strobe pulse $C_1$ only when the Null flip-flop $Q_N$ output (Graph H in FIG. 8) is true. As a result, the S/D flip-flop $Q_{SD}$ output will store (until changed) the most recently provided value of S/D provided from processor 10 (FIG. 1) and received in the form of the $(S/D)_t$ signal shown in Graph A of FIG. 8.

Although this description has primarily been directed to particular preferred embodiments of the invention, it will be understood that many modifications and variations in construction, arrangement and use are possible without departing from the true spirit of the present invention. The present invention is accordingly to be considered as including all modifications and variations coming within the scope of the appended claims.

What is claimed is:

1. In a digital data transmission system for communicating digital data over a plurality of individual transmission lines, the combination comprising:

transmitting means for transmitting digital data over at least first and second ones of said transmission lines, said transmitting means being operative for transmitting digital data over said first transmission line in a manner such that a first type of data is transmitted during first time periods and a second type of data is transmitted during second time periods occurring between said first time periods, and said transmitting means also being operative for transmitting a clock over said second transmission line concurrently with transmission of said first and second types of data over said first transmission line and in a manner such that said clock has a first repetition rate during said first time periods and a second repetition rate during said second time periods;

said transmitting means including shift register means having a plurality of data inputs, at least one data output, a clock input, and a plurality of control inputs, said first and second types of data being applied to said data inputs of said shift register means, said first transmission line being coupled to said data output of said register means, and said clock being coupled to said clock input of said shift register means;

said transmitting means also including transmitter logic means for providing control signals to the control inputs of said shift register means such that said shift register means is operative in response to said clock and control signals to cause said first and second types of data to be serially coupled via the shift register means data output to said first transmission line during respective first and second time periods.

2. The invention in accordance with claim 1, wherein said first type of data is a message, and wherein said second type of data is message identifying data which identifies the types of messages transmitted.

3. The invention in accordance with claim 2, wherein input signals including a message are applied to said transmitting means, and wherein said transmitting means is responsive to particular ones of said input signals for providing a first time period during which the included message is transmitted over said first transmission line.

4. The invention in accordance with claim 3, wherein said transmitting means is responsive to an applied message identifying signal included in said input signals to cause said message identifying data to be transmitted over said first transmission line during second time periods, said message identifying data having a waveform indicating the type of next message to be transmitted.

5. The invention in accordance with claim 4, wherein said identifying data is transmitted as a rectangular wave signal to represent one type of message and as a constant value signal to represent another type of message.

6. The invention in accordance with claim 4, wherein said message comprises a plurality of message bits, wherein said transmitting means transmits said message bits serially over said first transmission line, and wherein said first repetition rate of said clock during said first time period is such as to provide a maximum of one transition for each transmitted message bit.

7. The invention in accordance with claim 1, 2, 3, 4, 5 or 6, wherein said first type of data comprises a plurality of binary signals which are applied to a first plurality of said shift register data inputs, wherein said second type of data comprises at least one binary signal applied to another of said shift register data inputs, wherein said shift register means is operative in response to said clock and to load control signals applied to said shift register control inputs to cause the applied binary signals of said first type of data to be loaded, wherein said shift register means is operative in response to said clock and to first shift control signals applied to said shift register control inputs to cause the applied binary signal of said second type of data to be outputted to said first transmission line via said shift register means data output, and wherein said shift register means is operative in response to said clock and to second control signals applied to said shift register control inputs to cause loaded binary signals of said first type of data to be serially shifted and outputted to said first transmission line via said shift register data output.

8. The invention in accordance with claim 7, wherein said shift register means is further operative in response to said clock and to said load control signals to cause one of the applied binary signals of said first type of data to be outputted to said first transmission means via said shift register means data output; wherein said shift register means is operative in response to said clock and to said first shift control signals to cause the remaining loaded binary signals of said first type of data to be serially shifted and outputted to said first transmission line via said shift register means data output; and wherein said transmission means provides said load control signals during the first clock period of each of said first time periods, provides said first shift control signals during the remaining portion of each of said first time periods, and provides said second shift control signals during said second time periods.

* * * * *

UNITED STATES PATENT AND TRADEMARK OFFICE
CERTIFICATE OF CORRECTION

PATENT NO. : 4,271,510
DATED : June 2, 1981
INVENTOR(S) : Floyd W. Looschen

It is certified that error appears in the above—identified patent and that said Letters Patent is hereby corrected as shown below:

Col. 2, line 34, after "be" insert --a--.

Col. 8, line 15, change "$(S/D)_T$" to --$(S/D)_t$--;

line 50, change "$Q_C$" to --$\overline{Q}_C$--.

Signed and Sealed this

Fourth Day of August 1981

[SEAL]

Attest:

GERALD J. MOSSINGHOFF

Attesting Officer

Commissioner of Patents and Trademarks